United States Patent Office 2,985,130
Patented May 23, 1961

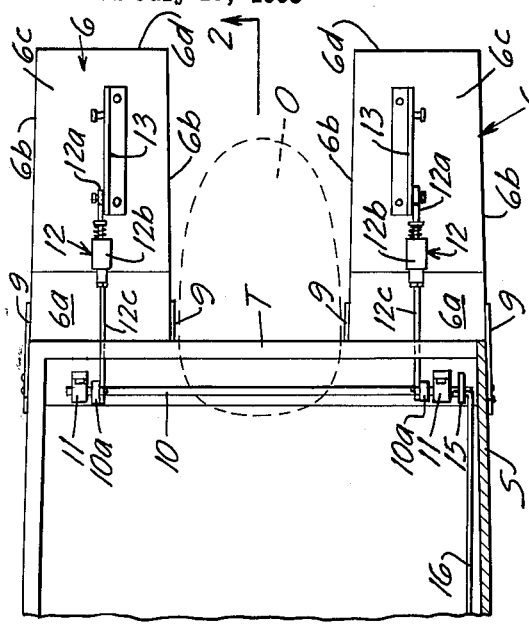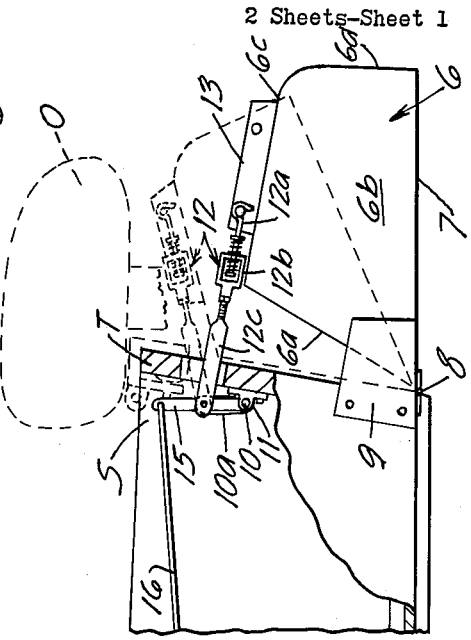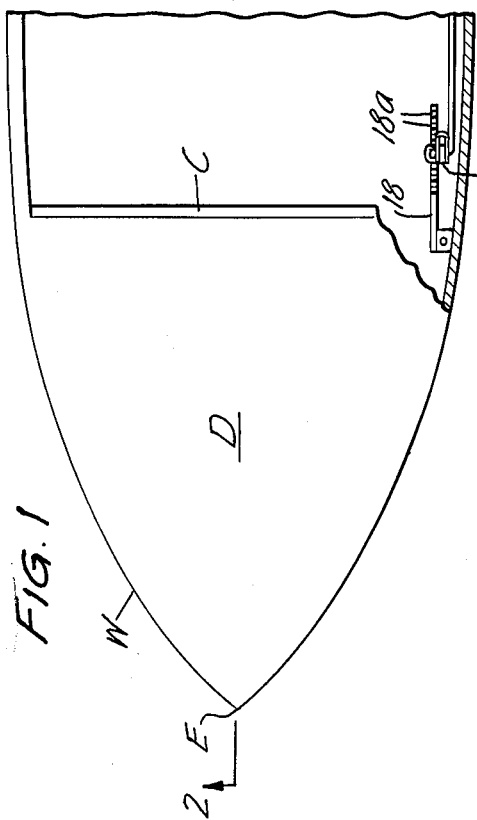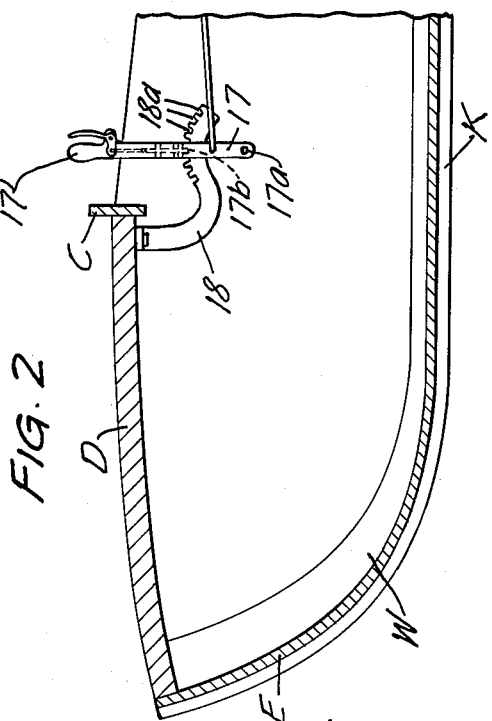

2,985,130
ADJUSTABLE PLANING-FLOATS
FOR POWER BOATS

Joseph H. Jacobs, 1445 El Prado, Fort Myers, Fla., and Marcellus L. Jacobs, Rt. 3, Box 815, Fort Myers, Fla.

Filed July 10, 1958, Ser. No. 747,736
2 Claims. (Cl. 114—66.5)

This invention relates to power boats equipped with either inboard or outboard motors and particularly to equipment or attachments which improve the riding qualities and stabilization thereof under various conditions in travel or at rest.

At the present time many difficulties are encountered in the operation of smaller power boats, particularly those ranging from lengths of 10 to 30 feet because of widely varying conditions including direction of travel relative to wind and waves, speed of travel, distribution of loads and variable contours of hull bottoms.

Many boats, particularly at higher speeds, ride with the bow and a substantial portion of the fore hull structure out of water and with stern disposed close to the water level. Such riding, if waves are present, produces severe slapping or pounding causing discomfort to passengers as well as stresses imposed upon hull and motor. Many small power boats in travel or at rest, have inadequate stabilization and displacement in the stern sections with the result that wallowing of such boats is common in the trough of waves and swamping through action of stern waves frequently occurs. Conditions are very variable when a boat changes its course relative to waves and winds.

The aforesaid objections and problems have been increased in recent years by the use of heavier and more powerful engines, particularly of the outboard type which often per se produced improper distribution of loads not foreseen or intended by the manufacture of the hulls.

It is an object of our present invention to provide as attachments or as standard equipment, readily adjustable planing-floats located at the stern and adapted to provide additional displacement to stabilize the boat and prevent swamping thereof as well as to shift the planing angle of the boat in travel at various speeds and under widely varying conditions of wind and waves to maintain smooth gliding of the boat in usual wind conditions and during the various speed ranges and regardless of direction of travel relative to wind and waves.

More specifically, it is an object to provide preferably a pair of transversely spaced stern floats attached to the transom or stern portion of a power boat and having readily adjustable planing elements at the bottoms thereof which may be instantly angularly adjusted to suit the varying water, wind and speed conditions.

A further object is the provision of a simple but highly efficient attachment which may be readily and inexpensively applied to conventional small power boats varying widely in design and construction, which does not interfere with the launching or transportation of the boat by trailer or other medium and which enables in operation, the pilot to instantly vary planing conditions of the boat in accordance with requirements imposed by changing conditions such as increased or decreased speed and change in directional travel relative to waves.

With our improved apparatus or equipment, additional stabilization and displacement at the stern portion of a small boat is always available without producing any appreciable slowing up of the speed and unexpectedly, regardless of the many varying wind and wave conditions and directional travel of the boat, the objectionable pounding or slapping may be eliminated at varying speeds by very simple adjustment changes in the angulation of planing elements controllable from the driver's seat.

These and other objects and advantages of our invention will more fully appear from the following description made in connection with the accompanying drawings wherein like reference characters refer to similar parts throughout the several views and in which:

Fig. 1 is a foreshortened plan view of a power boat of the outboard motor type having a form of our invention including finger-operated controls applied thereto and showing the positioning of the main portion of the motor in dotted lines;

Fig. 2 is a vertical section taken longitudinally along the line 2—2 of Fig. 1 with certain of the dotted lines showing the planing-float in raised or elevated position for transporting or for introduction of the boat into the water from a trailer;

Figure 3:
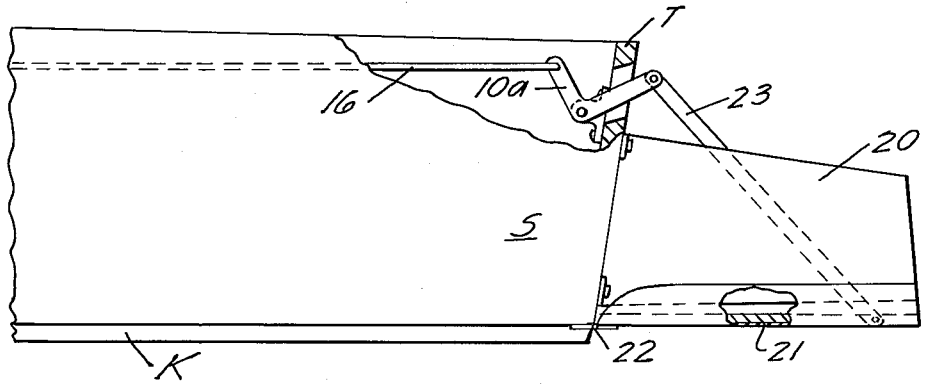
Fig. 3 is a vertical section of the rear portion of a boat having an alternative form of our invention applied thereto.

Referring now to the form of our invention illustrated in Figs. 1 and 2, a boat of conventional structure is illustrated having the bow B, the stern portion S and the usual transom or stern plate T having its upper edge centrally recessed for accommodation of the attachment bracket of a conventional outboard motor indicated as an entirety in dotted lines by the letter O. The hull of the boat includes the bow cutting edge E and a longitudinal keel board or keel K and a fore deck D which has a narrow upstanding cowl C defining the rear edge thereof and separating the forward compartment below deck D from the cockpit of the hull.

Our invention comprises in close cooperating relation with the hull and stern structure of a boat, a stern float and planing mechanism which increases the displacement and stability of the stern portion of the boat and which as to the planing surface or element, is instantly angularly adjustable to vary the over-all planing effect and consequently, the positioning of the bow and hull under widely different and varying conditions when the boat is traveling and when it is at rest on the water.

We preferably employ two transversely spaced, substantially identical float members indicated as entireties by the numeral 6 which as shown may be in the form of somewhat elongated hollow bodies constructed for example of non-corrosive sheet metal, composition material such as reinforced plastic with glass fibers or the like for reinforcing, or which may be constructed from cellular buoyant material of non-porous, closed cell construction.

The float members or bodies in the form of Figs. 1 and 2, have sharply inclined forward walls 6a, side walls 6b which taper somewhat from front to rear and top walls 6c which decline rearwardly somewhat from the forward edges thereof, merging preferably through rounded shoulders to the rear walls 6d. The float bodies as illustrated, are hollow and closed and the bottoms thereof in the form of Figs. 1 and 2, are smooth, preferably substantially rigid and planar and constitute planing surfaces or elements 7. The lower forward edges of the float bodies 6 are attached as shown to the rear of the transom or stern plate T by rugged hinge structure 8 in such manner that the angulation of the planing elements or surfaces 7 relative to the adjacent bottom stern portion of the hull may be varied within a substantial range while nevertheless emanating at forward edge substantially continuously from the under stern portions which of course produce predetermined planing effects of the boat hull during travel. The sharp inclination of the forward walls 6a of the float bodies enable the entire bodies with planing surfaces, to be swung upwardly as illustrated by the dotted lines in Fig. 2, thereby disposing the planing surfaces approximately at 45 degrees with the horizontal to facilitate transportation of the assembled boat with out equipment thereon and to further facilitate unloading of the assembled boat from a trailer or the like, rear foremost, into the water.

Vertical shield plates 9 are rigidly attached as shown to the stern plate or transom member T, projecting rearwardly in overlapping relation and substantially flush against the side walls and each of the side walls 6b of the two float bodies. These shield plates prevent streams or currents of water from entering between the forward end of the float bodies and the stern of the boat which if permitted, would slow up the speed during travel.

The transversely spaced positioning of the two float bodies 6 as will be seen from Fig. 1, leaves a deep and rather wide well portion for fully accommodating the enlarged upper portions including gas tanks, of various convention outboard motors. We prefer that the float bodies be so attached to the boat transom or stern plate that the outer sides 6b of the bodies extend substantially continuous from the side-stern-hull portion.

To accomplish important objects of our invention for planing control of the over-all boat, to overcome pounding or slapping under various conditions, we have provided instantly controllable adjustment mechanism for varying the angulation of the planing elements 7 relative to the general under contour of the stern portion of the hull. Such mechanism is readily controllable from the pilot's seat or station within the cockpit.

While various devices such as steering wheel windlasses and lever systems may be utilized, as shown we employ at the rear of the cockpit and preferably elevated slightly above the top of the float bodies 6, a transverse rock shaft 10 journaled at its ends in suitable bearings 11 and having rigidly affixed adjacent the ends thereof upstanding lever arms 10a horizontally aligned in position and each being substantially aligned with the longitudinal center planes of the float bodies. The outer and free ends of the lever arms 10a are interconnected with central portions of the top walls 6c of the float bodies by preferably cushioned, rigid linkage in each instance indicated as an entirety by the numeral 12. In the form of the linkage illustrated in the drawings, a rear hook link element 12a is employed, readily interconnectible at two or more points with an elongated rail 13 which extends longitudinally and centrally and is rigidly affixed to each of the tops of the float bodies. This rail as shown has in each instance a forward recessed portion for engagement with the hook of link 12a and it also has a rearwardly disposed recessed portion for engagement with said hook to facilitate forward and upward swinging of the associated float body into the dotted-line, transporting and unloading position shown in Fig. 2.

Figure 4:
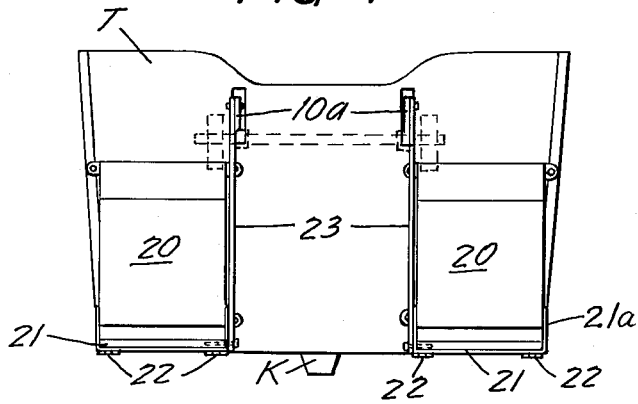
Fig. 4 is a rear elevation of the form of the invention applied to a boat shown in Fig. 3.
Figure 5:
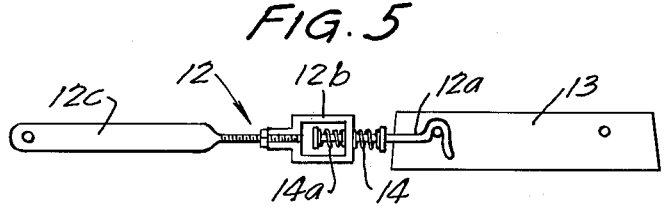
Fig. 5 is a detail side elevation on a larger scale showing the adjustable and cushioned linkage connection between one of the float bodies and the adjustable control mechanism.

The linkage structure 12 includes a turnbuckle cage 12b connected at its forward end with an elongated link element 12c and link 12c extends into the hollow medial portion of the turnbuckle structure as shown in the detail view Fig. 4 and is cushioned forwardly and aft by interposition of contractile springs 14 and 14a respectively. Such small amount of cushioning relieves sudden strains and stresses which would otherwise be put upon the adjustment connections for the float bodies 6.

As shown an upstanding lever arm 15 is rigidly affixed to one end of the rock shaft 10 which is interconnected by an elongated rod or link 16 with a control lever 17 mounted as shown on a suitable bearing 17a affixed to the side hull portion within the cockpit and preferably adjacent the steering wheel or in any event for accessibility to the pilot. Lever 17 is provided with a downwardly releasable dog 17b adapted to be seated selectively in any one of the notches 18a of a segment or notched bar 18, also affixed to the interior of the hull.

Thus, as shown the angulation of the planing elements or surfaces 7 of the two floats 6 may be instantly and similarly varied by ready shifting of the control lever 17, rearward shifting of the lever in the adjustment mechanism shown causing the planing surfaces to angulate downwardly while forward shifting of lever 17 swings the planing surfaces upwardly. The angular adjustments in the form of the invention shown are all pivotal on the axes of the hinge structures 8 which connect the forward lower edges of the float elements to the stern plate or transom T of the boat.

Operation

In operation of the float bodies 6 are removed downwardly from their transportation or unloading positions which may be readily accomplished in the linkage connections illustrated in Figs. 1 and 2 by releasing the two hook elements 12a of the connector linkage 12 and attaching the hooks to the forward recesses of the rail members 13, the float members being generally disposed horizontally and longitudinally as shown in full lines in Figs. 1 and 2.

In such operative positions, the stern portion of the boat is always stabilized whether the boat is at rest or is traveling, additional displacement having been added to the stern of the boat and extending longitudinally thereof and conforming generally to the side hull design.

In travel of the boat forwardly as the speed is increased in most conventional hull structures, planing effect and usual load distribution causes the bow to rise out of the water and when waves are encountered, bouncing and pounding with its unpleasant and physical jarring effect would normally ensue but for the combinative effects of our planing and float equipment. Upon the first indications of such bouncing and pounding, control lever 17 is adjusted, rearwardly in the mechanism illustrated, angulating the planing surfaces 7 downwardly from the position shown in full lines in Fig. 2 to an amount only requisite to eliminate this disturbance. If the speed of the boat is increased in the first adjusted positions or if the direction of travel is opposite to the movement of the waves, further downward adjustment of the planing elements is required to prevent said bouncing reaction. The over-all effect of such planing adjustments is to keep the bow cutting edge E at least partially in the water, thereby actually cutting waves and preventing bouncing thereover. Such adjustments may be very quickly and easily made through manipulation of the control lever 17 or other equivalent control in association with the setting mechanism for at all times latching the lever, its connecting rod 16 and the rock shaft in the desired adjusted position.

If fast travel of the boat is suddenly abated as in preparing for landing or in stopping to fish, even though waves are traveling towards the stern of the boat it will not be swamped due to the buoyancy and stability provided by the float bodies 6. Thus when the speed is lessened or abated, the stern will ride relatively high in the water.

If in desired travel the boat must move through troughs between waves, wallowing and dangerous tipping is eliminated positively by the widely spaced relation of the two float bodies extending longitudinally and rearwardly from the stern of the hull.

In Fig. 3, we have shown another form of the invention where the float bodies 20 are of generally the same shape as the boat bodies 6 of the first form, but are detachably and rigidly secured to the transom or stern board of the boat and with the forward ends thereof substantially flush with the exterior of the transom. The spaced relation of the two float bodies 20 is similar to that of the form first described.

In this form of the invention auxiliary, angularly adjustable planing plates are provided, one disposed at the bottom and below each of the float bodies 20 and which may constitute rigid non-corrosive metal plates 21 coextensive in area and shape to the bottom proper of the body and underlying the same in each instance with the forward edge thereof hinged by rugged hinge structure 22 to the forward lower edge of the associated body. The planing plates 21 preferably have along their longitudinal edges, upturned shielding flanges 21a which overlie in close working relation, the side walls of the lower portion of the associated float body to prevent water current from being set up between the plates and bodies.

To readily adjust and set the planing plates 21 angularly the same general mechanism may be utilized, as has been illustrated and described with reference to the form of the invention shown in Figs. 1 and 2. However, the linkage 23 connecting the small lever arms 10a of the rock shaft 10 with the planing plates must be decidedly elongated and extend downwardly to the outer portions or intermediate portions of the plates 21 along the respective inner sides of the bodies 20.

The operation, functions and advantages of the form of our invention shown in Fig. 3 are substantially identical to the form previously described.

From the foregoing description it will be seen that we have provided very simple but highly efficient equipment adapted as an attachment or as standard equipment for conventional small craft or power boats now extensively manufactured and used which will overcome under a wide variety of different conditions as to wind, waves, boat loading and directional travel, serious objections now inherent in boats of this class whether employing inboard or outboard motors.

It will of course be understood that various changes may be made in the form, details, arrangement and proportions of the parts without departing from the scope of our invention.

What is claimed is:

1. A stern float and planing attachment for use with power boats of the type having a conventional one-piece hull including a bow, stern and bottom portion and an upstanding stern plate, said attachment comprising a pair of substantially identical, transversely-spaced water-displacement bodies adapted to be secured in rearwardly and longitudinally extending relation to the transom plate adjacent the opposite side portions thereof, said water-displacement bodies being of box like configuration and when attached to a boat each having its lowermost surface substantially co-planar with the bottom of the boat, a pair of substantially flat planing plates each being positioned along the lowermost surface of one of the water displacement bodies and each plate having hinge connection at its forward end with a forward end of the lowermost surface of its associated water-displacement body for variable angular adjustment relative to the latter along axes disposed transversely of the stern of the boat, each of said plates being of a size and shape corresponding to the size and shape of the lowermost surface of its associated water-displacement body and each plate having upturned shielding flanges along opposite longitudinal edges thereof for overlying opposed side surfaces of its associated water-displacement body to prevent the occurrence of a water current between the plates and bodies, and mechanism controllable within the boat for instantly adjusting and setting the angular positions of said planing plates.

2. The structure as defined in claim 1 wherein said mechanism includes an adjustment actuating member adapted to be mounted in the stern portion of the boat, a pair of thrust links operatively connected with said actuating member and each being connected at its outer end with one of said planing plates, and means connected with said actuating member for reversibly moving the same, said means having a control element accessible within the hull whereby angular adjustment and setting of angular positions of said planing plates may be instantly achieved.

References Cited in the file of this patent

UNITED STATES PATENTS

| | | |
|---|---|---|
| 1,200,259 | Steinmetz | Oct. 3, 1916 |
| 1,752,406 | Wetch | Apr. 1, 1930 |
| 1,760,696 | Herrmann | May 27, 1930 |
| 1,848,018 | Maranville | Mar. 1, 1932 |
| 1,855,076 | Warner | Apr. 19, 1932 |
| 2,144,111 | Higgins | Jan. 17, 1939 |
| 2,212,088 | Tomassi | Aug. 20, 1940 |
| 2,370,318 | Lake | Feb. 27, 1945 |
| 2,576,744 | Anderson | Nov. 27, 1951 |
| 2,807,228 | Vandre | Sept. 24, 1957 |
| 2,816,521 | Alexander | Dec. 17, 1957 |

FOREIGN PATENTS

| | | |
|---|---|---|
| 1,139,479 | France | Feb. 11, 1957 |